United States Patent [19]

Genma et al.

[11] 4,424,562

[45] Jan. 3, 1984

[54] DATA PROCESSING SYSTEM HAVING PLURAL ADDRESS ARRAYS

[75] Inventors: Kazutoshi Genma, Sagamihara; Akio Sasaki, Hadano, both of Japan

[73] Assignee: Hitachi, Ltd., Tokyo, Japan

[21] Appl. No.: 180,473

[22] Filed: Aug. 22, 1980

[30] Foreign Application Priority Data

Aug. 24, 1979 [JP] Japan .................. 54-107766

[51] Int. Cl.³ .......................................... G06F 13/06
[52] U.S. Cl. ................................................ 364/200
[58] Field of Search ... 364/200 MS File, 900 MS File

[56] References Cited

U.S. PATENT DOCUMENTS

| | | | |
|---|---|---|---|
| 3,699,535 | 10/1972 | Klein | 364/200 |
| 4,056,844 | 11/1977 | Izumi | 364/200 |
| 4,077,059 | 2/1978 | Cordi et al. | 364/200 |

*Primary Examiner*—Felix D. Gruber
*Assistant Examiner*—D. Rutherford
*Attorney, Agent, or Firm*—Antonelli, Terry & Wands

[57] ABSTRACT

In a system including a single main storage or memory and two or more processing units sharing the main storage or memory, there are provided two address arrays for storing the addresses of the data of the main storage or memory which is stored in a buffer storage or memory, one address array storing the same addresses as those stored in the other address array. One of the address arrays is used for reference to the buffer storage or memory by the own or associated processing unit, while its other address array is used for detecting that the store address from another processing unit to the main storage or memory is coincident with one of the addresses stored therein. When the coincidence of addresses is detected, the corresponding address in the other address array is invalidated or cancelled, and the roles of the two address arrays are interchanged. Subsequently, the corresponding address in the one address array is invalidated cancelled. During this period of time, the reference for the own or associated processing unit is performed by its other address arrays without interruption.

2 Claims, 9 Drawing Figures

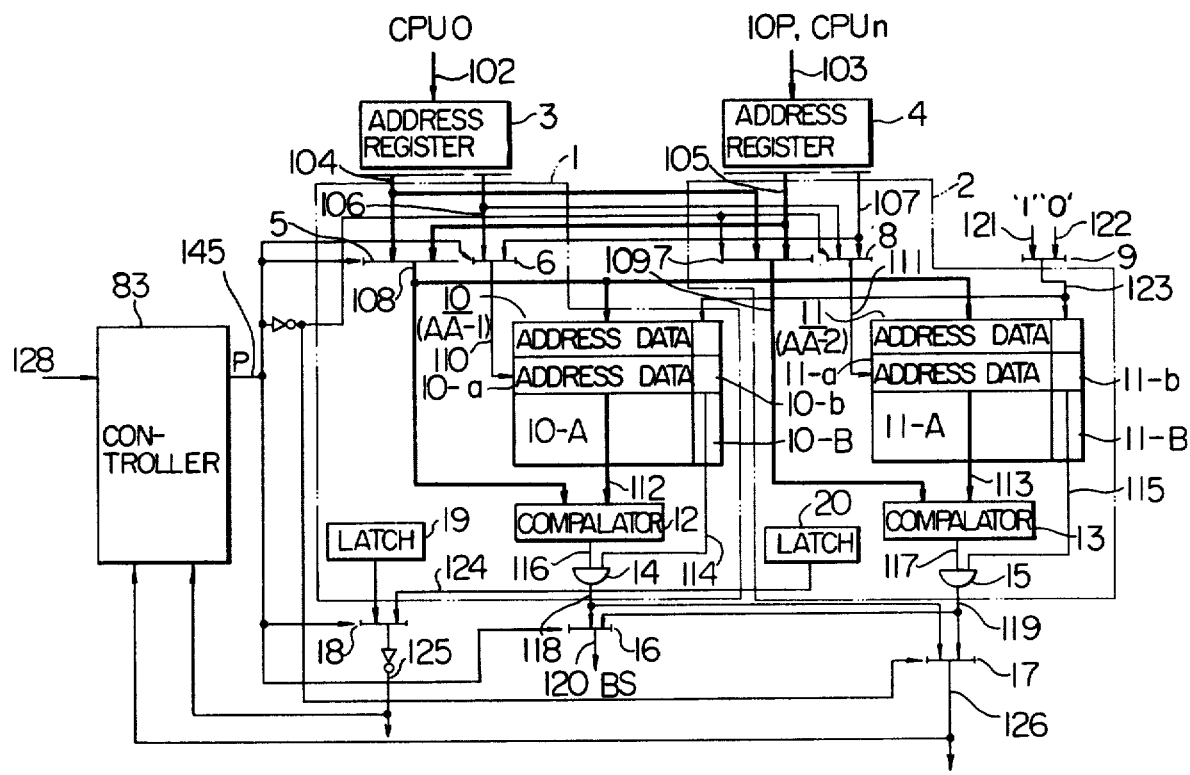

DATA PROCESSING SYSTEM HAVING PLURAL ADDRESS ARRAYS

BACKGROUND OF THE INVENTION

1. Field of the Invention

This invention relates to a data processing system having a plurality of processing units and a main storage or memory which is shared by each of the processing units.

2. Description of the Prior Art

In a data processing system, a high-speed buffer storage or memory is generally introduced in order to shorten the access time from a central processing unit (CPU) to a main storage or memory. A data block read out of the main storage by the CPU is stored in the buffer storage, and the subsequent access on data within the same block is performed to the buffer storage, not to the main storage, so that the data can be read out at a high speed.

The buffer storage thus stores part of information in the main storage and is accessed instead of the main storage. Therefore, the stored data in the buffer storage must always be the same as the corresponding part of information in the main storage. If the contents in the main storage are renewed by other information, an examination must be made on whether or not the data block including part of the original contents of the main storage remains stored in the buffer storage. If present in the buffer storage, this original data block must be treated invalidated or cancelled so that the CPU can not access the data block of the buffer storage. The new information is to be read out from the main storage.

The main storage is shared by a single CPU and an input-output unit (IO unit), or in the case of a multiprocessor, it is shared by a plurality of CPU's and IO units. Usually the buffer storage is provided at each CPU.

The storage is provided with a address array (AA) which stores the addresses of a number of data blocks found in the main storage. Accordingly, a determination of data of a given address in the main storage is present in the buffer storage can be made by checking if the address in the main storage is stored in the address array.

When a processing unit writes a data block into a main storage, the same data block including the write-in address is simultaneously written into a buffer storage which belongs to the processing unit, renewing the old contents thereof, if any, so that the contents of the buffer storage corresponds to those of the main storage. However, the data block in the main storage which corresponds to that in the buffer storage of the CPU to which the buffer storage belongs may be renewed by associated IO units or other CPU's.

In order to prevent such non-coincidence of the contents of the buffer storage with those of the main storage, it is necessary that a write address issued by another processing unit be received and used to refer to the address array AA for checking whether the data block address coincident with the write address exists in the address array AA or not. However, this reference inhibits the reference operation of the CPU to the address array AA when the CPU accesses the buffer storage. In other words, during the reference operation of another CPU with a write address, the reference operation with the access address by the associated CPU to which the buffer storage belongs can not be performed. This reduces the processing speed of the associated CPU. In order to prevent the reduction of such processing speed, there has been proposed means as disclosed in U.S. Pat. No. 4,056,844. According to this prior art, two address arrays AA's of the same construction are provided to store the same addresses. If one of the AA's is represented by AA-1, and the other by AA-2, the AA-1 is used only for examining whether the access address data for access by its own or associated CPU exists in the buffer storage or not, while the AA-2 is used only for examing whether the write-in store address for another processing unit exists in the buffer storage. If the same address is detected in the AA-2, invalidation treatment is performed as described above, and the same address in the AA-1 as that invalidated in the AA-2 is also invalidated. According to this prior art, while the AA-2 is being referred to by the store address from another processing unit, the AA-1 can be referred to delay by its own or associated processing unit quite independently from the AA-2, and thus the processing speed is little reduced. However, when it is needed to invalidate the address in the AA-1, the AA-1 is invalidated instead of being referred to by its own or associated processing unit. Thus, the reference operation of the associated processing unit is still obstructed by the invalidation process. If such an invalidation process often occurs, the processing speed of the associated processing unit is reduced considerably.

SUMMARY OF THE INVENTION

It is an object of the invention to provide a control system for a buffer storage which does not reduce the processing speed of a processing unit, and further does not delay the processing unit from invalidation of the addresses stored in the buffer address arrays.

According to this invention, there are provided two buffer address arrays (AA's) of the same construction and each having the same addresses stored therein. At any given time, one of the two AA's is referred to by addresses from the associated processing unit, while the other AA is referred to by addresses from another processing unit. When it is detected that a data block address including the store address from the other processing unit is present in the other AA, the data block address in the other AA is invalidated. Subsequently, the roles of the two AA's are interchanged. If the other AA which has been used for being referred to with the store address from the other processing unit detects the address identical with the store address therein, it invalidates the address and then is switched to be used for being referred to with the address from the associated processing unit. The one AA which has been used for being referred to with an address from the associated processing unit is changed in its role, invalidates the address previously detected by the other AA, and then examines the store address from the other processing unit. Thus, the two AA's are interchanged in their roles in such a manner as described above each time there occurs an agreement between the addresses stored in the AA and the store address as mentioned above.

BRIEF DESCRIPTION OF THE DRAWINGS

FIG. 5 is a block diagram of an embodiment of the present invention.

FIG. 6 is a timing chart of operation of the storage control unit of FIG. 5.

DESCRIPTION OF THE PREFERRED EMBODIMENTS

The buffer storage stores some of the data blocks within the main storage to serve for the rapid reading-out from the CPU. The construction and control of the buffer storage will be described hereunder with reference to FIG. 1. Refering to FIG. 1, there are shown a main storage or memory (hereinafter abbreviated as Ms 80) consisting of n columns, 0 to n−1, each including a number of blocks, and a buffer storage or memory (hereinafter abbreviated as BS 81) consisting of the same number of columns as that of the MS 80, each including a smaller number of data blocks than those included in each column of the MS 80. In the illustrated case, each column of the BS 81 has only four blocks.

Figure 1:
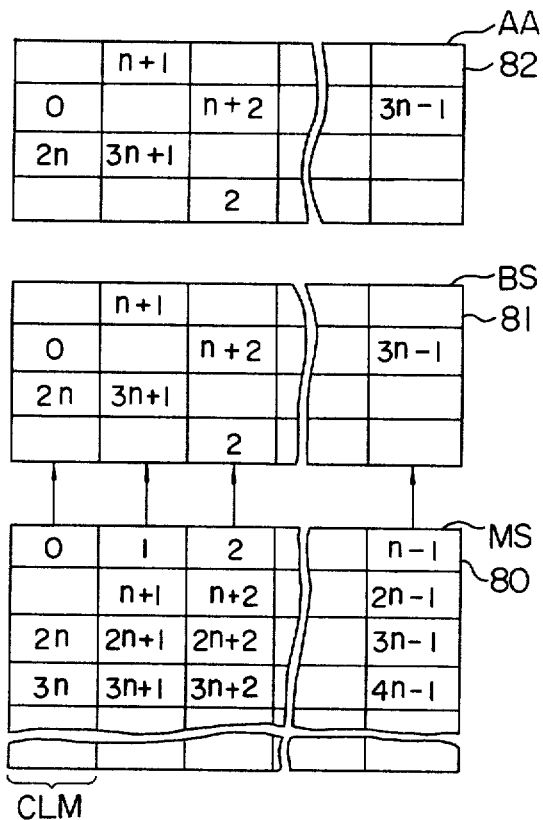
FIG. 1 shows correspondence between the data stored in the buffer storage and those stored in the main storage.

The data blocks of the 0-number column of the MS 80 are sure to be stored in the 0-column of the BS 81. Similarly, the data blocks of a certain-number column of the MS 80 are stored in the same-number column of the BS 81. A data block read out from the MS 80 to be used by a CPU is stored in a vacant block of the same-number column of the BS 81. If no vacant block is present in the BS 81, the contents of the data block which are the oldest are replaced by the new block data read-out from the MS 80. This control is known well in this art. In FIG. 1, there is also shown an address array (hereinafter abbreviated as AA) 82 which stores the actual addresses of the data blocks in the MS 80 such that the locations where the AA 82 stores the addresses correspond to those where the BS 81 stores the data blocks as shown in FIG. 1.

The data blocks stored in the BS 81 which are the copy of the data blocks of the MS 80 must always be the same as the blocks of the MS 80. To assure this, when any data block of the MS 80 is rewritten by its own or associated processing unit, the corresponding data block of the BS 81 should also be rewritten.

When data is written from an IO unit, or when data, in a multiprocessor system, is written from another CPU into the MS 80, a data path is required for transferring the data to the BS 81 where the data is to be stored at a block, resulting in a disadvantage. Therefore, when the BS 81 stores the contents of the block in the MS 80 which have been newly rewritten, use is generally made of means for invalidating the corresponding block within the BS 81. That is, comparison is made between the store address to the MS 80 from the IO unit or another CPU, and the address held in the AA 82, so that only when coincidence therebetween is obtained the corresponding block in the BS 81 is invalidated. A specific method of invalidating or cancelling the block is realized in the following manner. For example, a valid bit is added to each address of the AA 82 corresponding to each block in the BS 81 and set when data is stored in the BS 81. Then, the corresponding one of the valid bits is turned off to disable the corresponding data to be read out.

Assuming now that a CPU is provided with only a single AA, in the case where data is to be written into its MS 80 by its IO unit or another CPU, the AA is used for examining whether the data to be written-in is present in its BS 81 or not. If the data is stored in the BS 81, the valid bit of the AA 82 is turned off. During the time, the referring operation to the AA 82 is interrupted even though any request occurs from the CPU to the MS 80.

Figure 2:
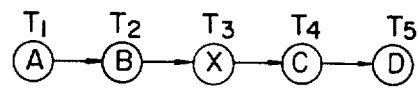
FIGS. 2 to 4 are explanatory diagrams to which reference is made in explaining how the address array operates.
Figure 3:
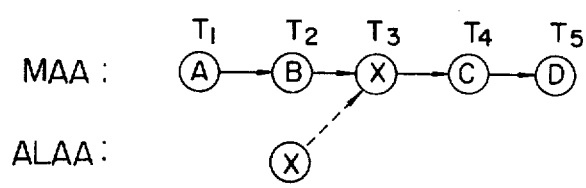

The present invention will be described by comparing this processing with another approach. FIG. 2 shows the case of having only a single AA. At time $T_1$, the AA is referred to by an access request A from the CPU, and at time $T_2$, an access request B is processed. Subsequently, when the IO unit, another CPU or the like produces a store address to start writing operation at time $T_3$, reference to the AA is made. If coincidence is detected in addresses, the corresponding block is invalidated or cancelled out. Then, at time $T_4$ an access request C is processed following the access request B. Therefore, the process of C is delayed by one-processing time. FIG. 3 shows the processing according to the U.S. Pat. No. 4,056,844 as mentioned above, in which two AA's are used, one (MAA) for the access request of its own or associated CPU, the other (ALAA) for the store address from another processing unit. Comparison is made between the ALAA and the address from another processing unit. If any coincidence does not occur, no processing is required and thus the MAA is able to continuously accept the access request from the CPU. If, however, coincidence occurs, the address of the ALAA is invalidated or cancelled at time $T_2$, and the address of the MAA is also invalidated or cancelled at time $T_3$ instead of normal processing. In the case where the possibility of coincidence is small, the speed of CPU using MAA with this approach is little reduced, but in the case where coincidence often occurs, the speed may be considerably reduced.

Figure 4:
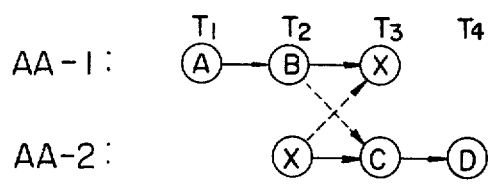

FIG. 4 shows a timing chart according to the present invention. Two address arrays AA-1 and AA-2 are used, and at time $T_1$, $T_2$ the AA-1 treats the access request from the CPU. The AA-2 performs the processing X for the store address from another processing unit at time $T_2$. When coincidence in address is detected in the processing X at time $T_2$, the roles of the AA-1 and AA-2 are reversed at time $T_3$, and the AA-2 treats the access request from the CPU. The coincident address detected in the AA-2 at time $T_2$ is invalidated or cancelled out at time $T_3$ by the AA-1. Thus, the access requests from the CPU are continuously treated. Unless coincidence in address is detected, the roles of the AA-1 and AA-2 are not interchanged.

FIG. 5 is a block diagram of the storage control apparatus of the invention, and FIG. 6 is a timing chart of operation thereof.

Control units 1 and 2 bounded by the respective changed lines have the same function and respectively have address arrays AA-1 10 and AA-2 11. An address register 3 holds an address relating to the access request issued from the inside of a central processing unit CPU0 to a main storage MS (not shown), and an address register 4 holds an address associated with a cancel request issued from the input-output unit IOP or another central processing unit CPUn to a buffer storage BS (not shown). These address registers 3 and 4 are coupled to the control units 1 and 2. The "cancel request" is defined as information indicating the existence of the store operation, which is sent together with the store address, from another processing unit.

The control unit 1 includes a selecting circuit 5 for selecting either of the address registers 3 and 4, a selecting circuit 6 supplied with part of the contents of each of the address registers 3 and 4, the AA-1 10 which is addressed through an output line 110 from the selecting circuit 6, a comparing circuit 12 for comparing the output on a line 112 from the AA-1 10 and the content on an output line 108 from the selecting circuit 5, and an AND circuit 14 for causing a compared result 116 from the comparing circuit 12 to be valid or invalid dependently on the content (on an output line 114) of a valid bit 10-b associated with a data address 10-a read out from the AA-1 10. The control unit 2 includes quite the same circuit components as does the control unit 1.

The AA-1 and AA-2, although simply illustrated in FIG. 5, are described in detail in the U.S. Pat. No. 4,056,844 which is accordingly incorporated herein for reference.

The operation of the control units 1 and 2 will be described, which function to treat the access request from the CPU0 to the MS and the cancel request to the BS, respectively. In this case, the control unit 83 controls the selectors 5 and 6 to select the output of the register 3 and the selectors 7 and 8 to select the output of the register 4.

When an access request to the MS occurs from the inside of the CPU0, the access address is held in the address register 3. A part of the contents of the address register 3 is applied to an output line 104 as a data to be compared with the AA-1 10, and another part thereof to an output line 106 for addressing the AA-110. The selecting circuits 5 and 6 select the output lines 104 and 106, respectively.

The AA-1 10 is formed of a storage 10-A for holding address information and a storage 10-B for holding the valid bits associated with the address information.

The address data 10-a (one of plural pieces of address data within the storage 10-A) specified through an address line 110 and the associated valid bit 10-b (one of the valid bits in the storage 10-B) are applied to read-out lines 112 and 114, respectively. The content on the line 112 is compared with that on the output line 108 in the comparing circuit 12, the compared result 116 therefrom being applied to one input of the AND circuit 14. The content on the line 114 is applied to the other input of the AND circuit 14. When the content on the line 114 is "1" showing the valid state, the value of the compared result 116 is made valid. When the content on the line 114 is "0" showing the invalid state, on the contrary, the value of the compared result 116 is invalidated or cancelled.

The AND circuit 14 supplies output "1" to an output line 118 only when the value of the compared result 116 is "1" showing coincidence and the content on line 114 is also "1". This output "1" from the AND circuit 14 implies that the accessed data of the MS is present in the BS. The content on the output line 118 is applied to selectors 16 and 17. The selector 16, at this time, selects the output line 118 by the control circuit 83, and thus the content on the output line 118 is fed through the selector 16 and a signal line 120 to a buffer control unit (not shown) as a read-out signal for the BS.

During the processing period, when a cancel request 128 to the BS occurs, the request is applied to the controller 83, and thus a store address associated with the cancel is set up in the address register 4. The output lines 105 and 107 from the address register 4 are selected by the selectors 7 and 8, respectively, so that stored information 11-a and 11-b are read out from the AA-2 11 and a comparator 13 operates, in the same manner as described above. When the compared result 119 is "0", namely when the address in the register 4 is not stored in the AA-2 11, there is no effect on the processing operation of the control unit 1.

When the value of the compared result 119 is "1", the following operation is performed.

A selector 9 selects an input line 122 which is always at the value "0", and supplies the value "0" to an output line 123. The selector 9 thus selects "0" when coincidence in address occurs, and selects "1" when a new data is written in the BS. The control therefor can be realized by the conventional control circuit (not shown). The content "0" on the output line 123 is written into the valid bit 11-b within the AA-2 11 which is addressed through an address line 111, thereby performing the invalidating or cancelling operation.

Then, at a proper time in the processing operation of the control unit 1, the selectors 5, 6, 7, 8, 16 and 17 are simultaneously switched to select the other input lines associated therewith which have not been selected so far. For example, the selector 5 selects the output line 105 of the address register 4. After this switching time, the control unit 1 operates the cancelling processing for the BS and the other control unit 2 operates the access processing within the CPU0 until the next switching occurs.

At the next timing to the switching, the content on the line 123 which remains at "0" is written in the valid bit location 10-b within the AA-1 10 thereby performing the invalidation or cancel processing.

The content on the address line 110 is still equal to that on the output line 107 from the address register 4 in which the address associated with the invalidation or cancellation is still latched.

The input line 108 to the AA-1 10 and AA-2 11 is used to cause the contents of the AA-1 10 and AA-2 11 to coincide to each other. That is, when the replacement of data within the BS is performed in the CPU0, it is necessary to rewrite the address data of the AA-1 10 and AA-2 11 corresponding to this rewriting data. In this case, the selectors 5, 6, 7 and 8 select the address register 3 which holds the address corresponding to the data to be replaced within the BS. That is, the selector 8 selects the input line 106, so that the content on the output line 110 becomes equal to that on the output line 111. The selector 9 selects an input line 121 which is always at "1", to make the output line 123 at "1". Under this condition, the content of the output line 108 is stored in the corresponding address data locations in the respective storages 10-A, and 11-A, and the content on the output line 123 is stored in the corresponding valid bit locations in the respective storages 10-B and 11-B, in the AA-1 10 and AA-2 11.

By this processing, the contents held in the AA-1 10 and AA-2 11 are made the same.

FIG. 6 shows the timing of the process in case that the data to be in validated or cancelled is present in the BS. The respective diagrams A, B, C, and D of FIG. 6 show the time lapse, a signal for showing the cancel request to the BS, the content stored in the address register AR4, and the content stored in the address register AR3. The respective diagrams E, F, G and H show the output of the selectors 5 and 6, the output of the selectors 7 and 8, the access operation on the address array 10, and the access operation on the address array 11.

At time $t_1$, the cancel request signal is being issued and the register AR4 stores a store address p at this time $t_1$ transferred from another processing unit. During the period of $t_1$ to $t_3$, the selectors 7 and 8 produce values of (p), and at times $t_1$ and $t_2$ the AA-2 is referred to. If there is selected the coincidence, the related address location within the AA-2 is cancelled during the period of $t_2$ to $t_3$ (as shaded). During this period, each of the reference operations on address array based on the addresses (k), (l) given from the internal processes in the central processing unit CPU0 can be carried out by the address array AA-1 without causing delay due to the above-mentioned invalidating process.

At time $t_3$, the control units 1 and 2 are interchanged in their roles. After $t_3$, the selectors 5 and 6 produce the contents (p) of the address register AR4 and the other selectors 7 and 8 produce the contents of the address register AR3.

As a result, during the intervals of $t_3$ to $t_4$ and $t_4$ to $t_5$, each of the reference operations on address array based on address (m), (n) given from the central processing unit CPU can be performed by the use of the AA-2, and during the interval of $t_3$ to $t_4$, the AA-1 undergoes invalidating or cancelling process (as shaded).

The control circuit 83 will next be described with reference to FIG. 7 and FIG. 8 which shows the timing chart of the operation of control circuit. Before the description of FIG. 7, circuit elements 19 and 20 of FIG. 5 will be first mentioned. These elements 19 and 20 store information indicating that the AA-1 10 and AA-2 11 are being referred to, or busy. These elements 19 and 20 have been used for control of reference to the associated address arrays, and store "1" when they are busy. The control circuit 83 is supplied with the cancel request 128, a signal 126 showing the presence of the store address from another processing unit in the associated address arrays and a busy signal from the AA-1 10 or AA-2 11, to control the selectors 5, 6, 7, 8, 16, 17 and 18 thereby interchanging the roles of the control units 1 and 2.

Figure 7:
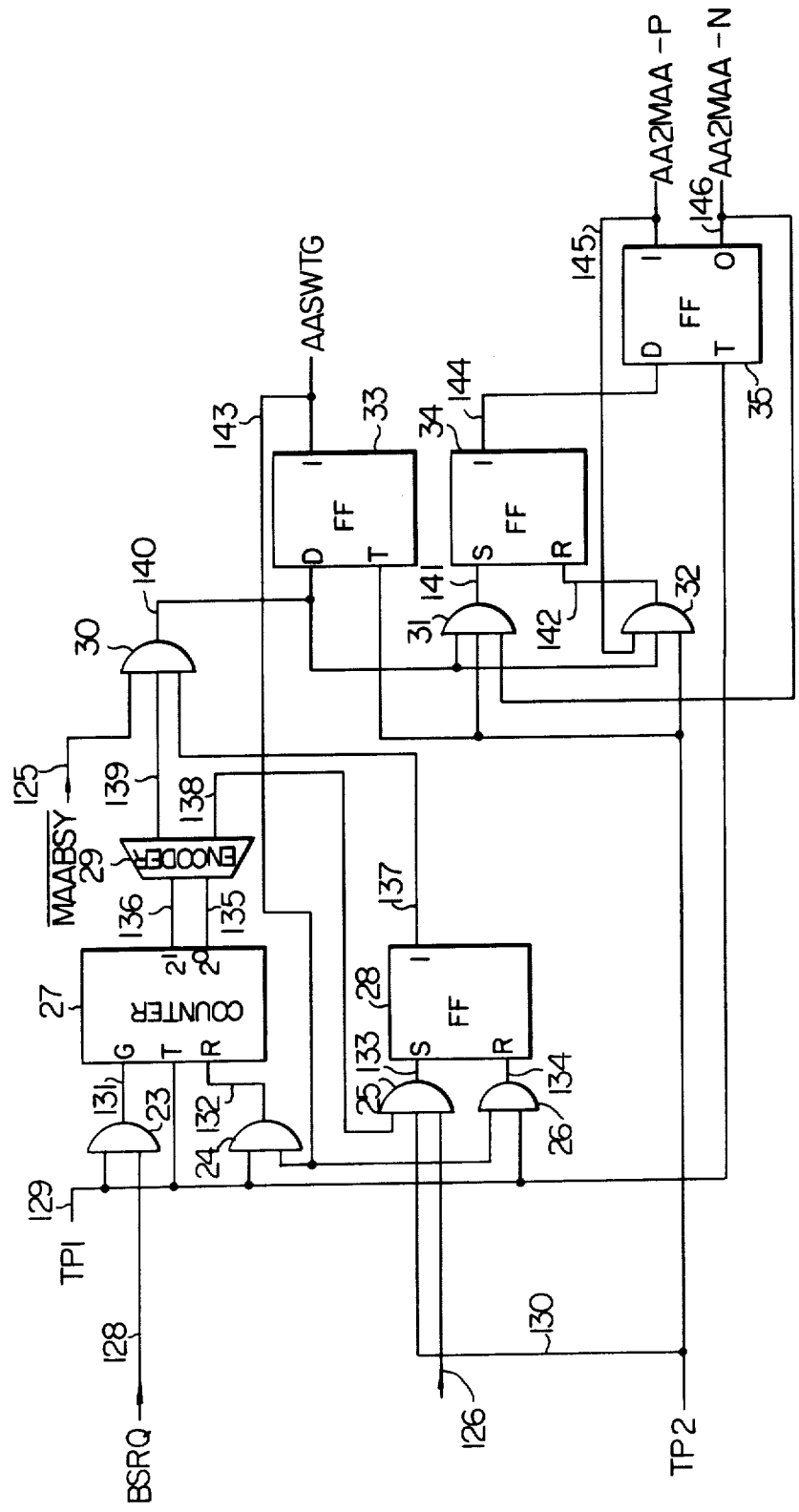
FIG. 7 is a block diagram of a control circuit 83 in FIG. 5.
Figure 8:
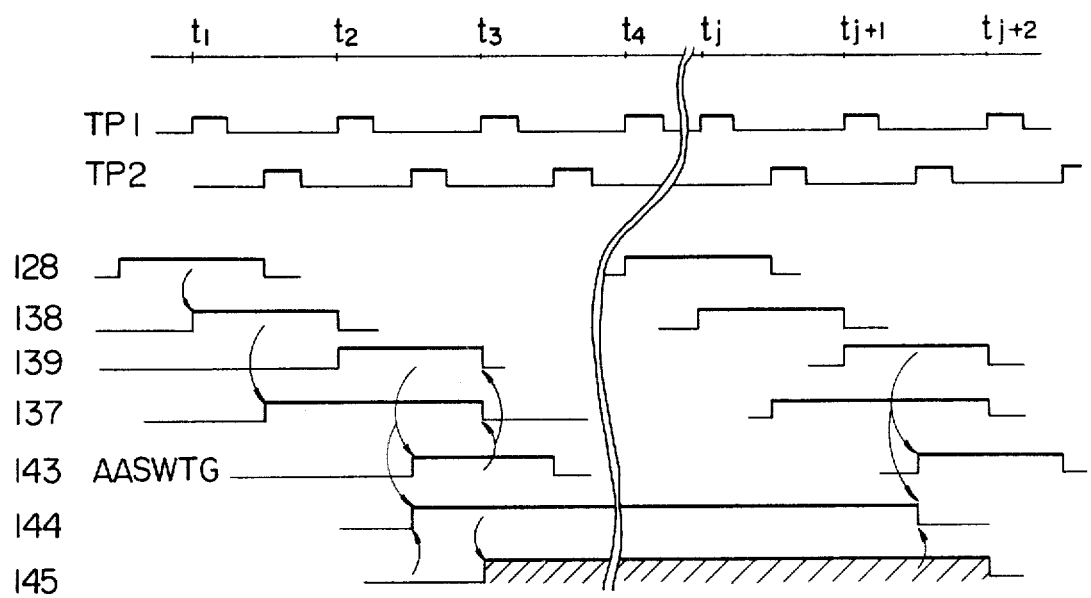
FIG. 8 is a timing chart of operation of the control circuit of FIG. 7.

FIG. 7 shows the switching control circuit for address arrays MAA and ALAA. The MAA represents the address array serving to process the access request from CPU0 (the own or associated CPU) and the ALAA represents the address array serving to process the store address from another processing unit. In FIG. 7, TP1 and TP2 represent timing pulses which alternately occur as shown in FIG. 8. A counter 27 of 2 bits is provided to count up at the timing of TP1. When the cancel request signal (BSRQ) 128 occurs, the output of an AND gate 23 is turned on in synchronism with the timing pulse (TP1) 129 to supply a start pulse through an output line 131 to the terminal G of a counter 27 which then starts counting. This counter 27 is a two-bit counter of which the content becomes 37 1" by the application of the first input pulse to the terminal G, becomes "2" by the application of the pulse TP1 to the terminal T and is reset to "0" by the application of a pulse to the terminal R. Such a counter is known well and thus will not be described in detail. This counter 27 is used here to specify the period ($t_1$ to $t_3$ in FIG. 8) until the switching. As shown in FIG. 6, two clocks are required from the reception of store address to the switching. If the phase of the pulse TP1 on the line 129 is taken as $t_i$ ($i=1, 2, 3, \ldots$) in FIG. 6, the counter 27 holds count "1" during the period of $t_1$ to $t_2$, the count "2" during the period of $t_2$ to $t_3$. A two-bit encoder 29 which is supplied with inputs through output lines 135 (showing value of $2^0$) and 136 (showing value of $2^1$) in FIG. 7 causes its output line 138 to be "ON" when the count is "1" and its output line 139 to be "ON" when the count is "2". When the signal line 126 is "ON" which shows coincidence in the ALAA, the output line 133 of an AND gate 25 becomes "ON" by the application of the timing pulse TP2 which appears on the line 130 during the interval of $t_1$ to $t_2$ in FIG. 8 and which is delayed in phase from the pulse TP1 and the signal on the output line 138. Then, a flip-flop (hereinafter abbreviated as FF) 28 holds the information of the coincidence in the ALAA. The output of the FF 28 is shown in FIG. 8 by 137.

An AND gate 30 is supplied with the output signal 137 of the FF 28, the signal on the output line 139 of the two-bit encoder 29 and a signal 125 showing that the MAA is not busy, to produce an output signal 140. The signal 125 is inversion of the value of the latch 19 when the AA-1 10 functions as the MAA. A flip-flop (FF) 33 is supplied at its D-terminal with the signal 140 and at its T-terminal with the pulse TP2 so as to be set, thus a signal 143 called AA switching (AASWTG) rising at the output of the FF 33, as shown in FIG. 8. An AND gate 26 connected at its output 134 to the reset terminal of the FF 28 is supplied with the signal 143 and pulse TP1, thereby resetting the FF 28. In other words, the FF 28, which stores the information indicating that the AA contains the address coincident with the stores address from another processing unit, is reset by the occurence of the AA switching signal for interchanging the address arrays. Quite similarly, an AND gate 24 connected at its output 132 to the R-terminal of the counter 27 is supplied with the pulse TP1 and signal 143 to reset the counter 27. A flip-flop (FF) 35 stores the information indicating that the AA-2 11 functions as the MAA. If the AA-1 10 functions as the MAA, and the AA-2 11 functions as the ALAA, the FF 35 is in the reset state and its output signal 146 is at a high level. An AND gate 31 connected at its output 141 to the set terminal of a flip-flop (FF) 34 is supplied with the signal 140, the pulse TP2 and the signal 146, so that the FF34 is set at the same time as the FF 33. Thus, the signal 144 as shown in FIG. 8 rises. At the next TP1, the FF 35 is set and as a result its output signal 145 occurs which implies that the AA-2 11 has been changed to serve as the MAA. The shaded part of the signal 145 in FIG. 8 is the period during which the AA-2 11 serves as the MAA. If it is assumed that after the period during which the AA-2 11 is the MAA and the AA-1 10 is the ALAA, next coincidence of addresses occurs again. This operation is shown in FIG. 8 by the range after time $t_j$. The counter 27, the FF 28 and FF 33 are operated in the same manner as described above. Since the FF 35 is in the set condition, the AND gate 31 is not opened, but instead an AND gate 32 connected at its output 142 to the R-terminal of the FF34 is opened by receiving the output 145 from the FF 35 and thus the FF 34 is reset. As a result, the signal 144 in FIG. 8 falls. Subsequently, a low level signal is applied to the D-terminal of the FF 35, and thus the FF 35 is reset at the timing of TP1. At this time, the AA-2 11 is switched from the MAA to the ALAA. The signal 145 thus produced is used to control the selectors in FIG. 5. When the signal 145 is at a high level, each of the selectors 5, 6, 16 and 18 selects the right-side input in the figure, and each of the selectors 8 and 17 selects the left-side input.

Thus, the AA-2 11 serves as the MAA while the AA-1 10 as the ALAA. When the signal 145 is at a low level, each of the selectors select their opposite input, thereby interchanging the roles of the AA-1 10 and AA-2 11.

As described above, the roles of the AA-1 10 and AA-2 11 are reversed each time address-coincidence is detected, and consequently the access operation of the CPU can be performed without interruption.

Figure 9:
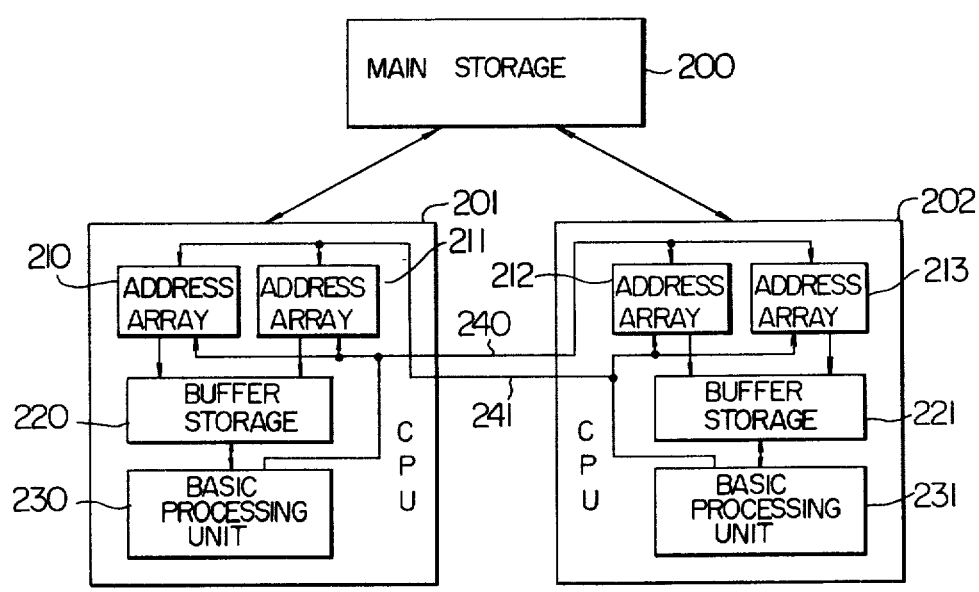
FIG. 9 is a block diagram of an example of a data processing system of a multiprocessor to which the present invention is applied.

FIG. 9 is a schematical diagram of a multiprocessor system to which the present invention is applied. A main storage 200 is shared by CPU's 201 and 202. The CPU 201 has a basic processing unit (hereinafter abbreviated as BPU) 230, a buffer storage (BS) 220 and address arrays (AA's) 210 and 211. The CPU 202 has the same elements. An address is applied to either of the AA 210 and AA 211 for reading or writing (access to) of data which the BPU 230 generates. If the address is a write address, the address is applied through a path 240 to either of the AA 212 and AA 213 of the CPU 202. Similarly, a write address from the CPU 202 through an address path 241 is applied to the remaining AA to which is not applied the address generated within the CPU 201 (the address from the BPU 230). When there is an address coincident with that transferred through the path 241, the address is switched between the AA 210 and 211.

What is claimed is:

1. A data processing system including a plurality of processing units and a main storage unit containing information shared by each of said processing units, the information in the main storage unit being addressed by addressing bits, at least one of said processing units comprising:

a. a buffer memory for storing part of the information stored in said main storage unit;

b. a plurality of address arrays each for storing at least some of the address bits constituting addresses in said main storage unit corresponding to information stored in said buffer memory, said address arrays being controlled so that they store identical contents;

c. a first detecting means for detecting whether or not there is coincidence in one of said address arrays in terms of at least some of the address bits constituting an access address issued from said at least one processing unit to said main storage unit;

d. a second detecting means for detecting whether or not there is any coincidence in a different one of said address arrays from said address array in terms of said at least some of the address bits constituting a store address issued from another processing unit to said main storage unit;

e. means for cancelling that address of said at least same of the address bits which has been detected as being coincident by said second detecting means; and f. means for controlling said first and second detecting means so that said first and second detecting means will carry out, during a period from completion of cancellation by said cancelling means until another coincidence will be detected in said second detecting means and cancellation thereof will be carried out by said cancelling means, detection operations on address arrays different from those on which said first and second detecting means are carrying out detecting operations.

2. The data processing system according to claim 1, wherein said first detecting means, second detecting means and said cancelling means have identical time frames for performing respective detection operations and cancellation operations.

* * * * *